(12) United States Patent
Huang

(10) Patent No.: US 10,219,521 B1
(45) Date of Patent: Mar. 5, 2019

(54) FOOD BUN WITH FORMED CAVITY

(71) Applicant: Yu Jane Huang, Beverly Hills, CA (US)

(72) Inventor: Yu Jane Huang, Beverly Hills, CA (US)

( * ) Notice: Subject to any disclaimer, the term of this patent is extended or adjusted under 35 U.S.C. 154(b) by 0 days.

(21) Appl. No.: 16/032,643

(22) Filed: Jul. 11, 2018

(51) Int. Cl.
*A21B 5/02* (2006.01)
*A21D 8/06* (2006.01)
*A21D 13/32* (2017.01)

(52) U.S. Cl.
CPC ............. *A21D 8/06* (2013.01); *A21D 13/32* (2017.01); *A21B 5/02* (2013.01)

(58) Field of Classification Search
None
See application file for complete search history.

(56) References Cited

U.S. PATENT DOCUMENTS

| | | | |
|---|---|---|---|
| 3,950,563 A | 4/1976 | Wheaton | |
| 4,020,188 A * | 4/1977 | Forkner | A23G 9/04 426/438 |
| 4,065,581 A | 12/1977 | Heiderpriem | |
| 4,144,356 A * | 3/1979 | McDaniel | A23P 10/10 426/134 |
| 4,214,517 A | 6/1980 | Caldwell | |
| 4,275,082 A * | 6/1981 | Dougan | A21D 13/19 426/100 |
| 4,656,935 A * | 4/1987 | Kukura | A21B 3/13 249/122 |
| 5,000,084 A | 3/1991 | Walliker | |
| 5,807,599 A * | 9/1998 | Weisberger | A21C 11/002 426/138 |
| D755,468 S | 5/2016 | Elliot | |
| 2012/0201927 A1 | 8/2012 | Meikle | |

FOREIGN PATENT DOCUMENTS

| | | |
|---|---|---|
| DE | 19820055 | 11/1999 |
| GB | 2062436 | 5/1981 |
| GB | 2203380 | 10/1988 |
| GB | 2302256 | 1/1997 |
| GB | 2401301 | 10/2004 |
| WO | 2004098295 | 11/2004 |

* cited by examiner

*Primary Examiner* — Patricia A George

(57) ABSTRACT

Food products, apparatus, systems and methods in which a removable insert is cooked inside a portion of bread dough, and the cooked bread is then cut to remove the insert. Inserts can be made with any safe material, preferably a polymer or a metal alloy, reusable or for one-time use only. Preferred inserts have a size and shape typical of a hamburger meat patty. Dough imbedded with an insert is cooked, preferably by baking in an oven at a temperature less than 250° C. for 15-20 min. After cooling, the bun is cut into two pieces, preferably substantially vertically and at least 10% off the center. The exposed insert is then removed, leaving a cavity in each piece of the bun.

18 Claims, 4 Drawing Sheets

FOOD BUN WITH FORMED CAVITY

FIELD OF THE INVENTION

The field of the invention is food products.

BACKGROUND

The following description includes information that may be useful in understanding the present invention. It is not an admission that any of the information provided herein is prior art or relevant to the presently claimed invention, or that any publication specifically or implicitly referenced is prior art.

Traditional hamburgers and sandwiches have two pieces of bread with fillings in between. Due to the open-sided design, fillings easily drip or fall out, potentially spilling out onto the surrounding environment, including the consumer's hands and clothing. This is especially problematic for juicy or over-sized fillings.

Various embodiments are known in the prior art in which cavities are formed within the bread of a bun. However, the known methods of making the cavities are either not well-described, or are problematic. For example, GB2401301 (Petrou) teaches a bun with a pocket opening at the top. There is, however, no disclosure about how to manufacture the pocket.

GB2302256 (Anders) teaches a bun that is cut in half horizontally, and a pocket is formed in both top and bottom halves by pressing a hard object into the cut surfaces of the two halves. GB2062436 (La Charite) teaches forming a recess in an elongated piece of bread by impaling the bread roll onto a spike. These methods are all considered to be suboptimal because they necessarily sacrifice the soft texture of the bun, since the recess is formed by compression.

Others teach using a mold or a cooking device that defines both an outer shape of the bun, and a recess with an opening on top. See e.g., U.S. Pat. No. 3,950,563 (Wheaton), U.S. Pat. No. 4,065,581 (Heiderpriem), U.S. Pat. No. 4,214,517 (Caldwell), and WO2004098295 (Andersen). Since these methods confine the dough in the mold as it is cooking, rising of the dough during baking is limited by the volume of the mold, which precludes producing a bun with a naturally-formed dome shape and a preferred texture. Moreover, the number of buns made during each batch is limited to the number of molds, which might not be suitable for large-scale production.

Thus, there is still a need for systems, devices, and methods for producing a pocketed bun, having a naturally formed domed shape, and that is suitable for large-scale production.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides food products, apparatus, systems and methods in which a removable insert is cooked inside a portion of bread dough, and the cooked bread (i.e., bun) is then cut to remove the insert.

In general, the inventive subject matter utilizes a relatively small insert, instead of a relatively large and cumbersome mold that gives shape to the entire portion of dough. Since the inserts do not impose special space or other requirements upon an oven, they can be used with existing baking facilities for large-scale production. Moreover, the inventive subject matter does not limit the natural expansion of the bread dough during baking, so that the bun has a natural shape and texture.

When cooked, preferred buns have a substantially rounded top, a substantially flat bottom, a soft interior, and a slightly to moderately browned exterior, with a size at least 12 cm wide and at least 6 cm tall. The corresponding uncooked dough preferably has a height of at least 5 cm, but in any event has sufficient size to hold an insert, and such that the final product would have a cavity large enough to hold fillings of a typical hamburger or sandwich.

An insert can have a size and shape typical of a hamburger meat patty, but could also have any sizes and/or shapes. Contemplated alternative shapes for inserts include a flattened sphere, a sphere, an egg, an oval, a square, and an irregular shape. Inserts can be made with any safe, non-toxic material, preferably a food-grade polymer or a metal alloy, reusable or for one-time use only. In preferred embodiments, inserts will have a non-stick material or coating to resist sticking to the dough. The insert can be embedded into a portion of dough in any suitable manner The bread dough can be cooked by baking, steaming, frying, or any other suitable cooking methods to produce a roll. In preferred embodiments, the dough imbedded with the insert is baked in an oven at temperatures of less than 250° C., for 15-20 min. Excessively high temperatures and prolong time are avoided to prevent excessive crusting and bubbling. After cooling down, the bun is cut into two pieces in any suitable manner. In preferred embodiments, the roll is substantially vertically (no more than 10° off vertical), since the roll has a substantially flat bottom and can stand vertically on a cutting platform. Finally, the insert is removed, leaving a cavity in each of the cut buns.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
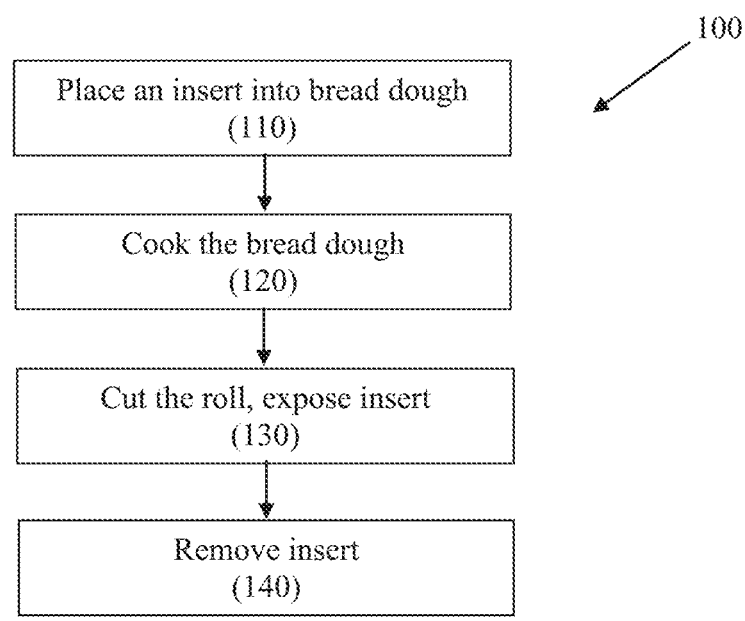
FIG. 1 is a flowchart of a method of making a bread bun with a cavity according to aspects of the inventive subject matter.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used herein interchangeably, the term "bun" or "roll" means a piece of bread, preferably with a substantially rounded top, a substantially flat bottom, a soft interior, and a slightly to moderately browned exterior. The bun can be of any size or dimension, but preferably, the bun is at least 12 cm wide and at least 8 cm tall. The bun may or may not have a hard crust.

FIG. 1 generally depicts steps in producing a bun with an insert-formed cavity. In step 110, an insert is placed inside an amount of bread dough. The insert can be embedded into a portion of dough in any suitable manner, by hand or by machine. Contemplated embodiments include placing an insert at the center of a portion of bread dough, lifting the dough on the side, and wrapping the insert with the dough. Other embodiments include placing an insert on a first amount of bread dough, adding a second amount of dough to cover the insert, and then merging the first and second amounts to form a unified portion of dough. Other embodiments include burying the insert inside the dough, by pushing the insert into the dough, and then closing the opening formed when the insert was inserted.

The dough can be made of any material that is suitable for making a bun. Contemplated ingredients include flour, water, oil, and optionally one or more other ingredients typically included in bread making, including for example, egg, salt, sugar, butter, milk, buttermilk, cream, honey, yeast, and baking soda. Contemplated flours include wheat, corn, rye, bean, chickpea, buckwheat, cornmeal, potato, potato starch, rice, and any combinations of these. Contemplated flours can also be gluten-free.

In preferred embodiments, portions of bread dough have a height of at least 4 cm, at least sufficient to surround an insert, and such that the final product would have a cavity large enough to hold fillings in a typical hamburger or sandwich. In preferred embodiments, a rising agent (e.g., yeast or baking soda) is sufficient to at least double the height of the dough compared to its size before the rising agent had any effect. The insert stays inside the dough during fermentation.

As used herein, the term "insert" means an object that is placed inside the dough. By comparison, the term "mold" means a hollow container used to give shape to dough when it is baked and hardens. The insert can be any shape or size that is suitable for occupying a space inside the dough. In preferred embodiments, the insert has a size and shape typical of a hamburger meat patty, for example, 10 cm in diameter and 3 cm in height. However, in some embodiments, the insert is larger to accommodate a large filling size. Contemplated inserts can have a shape of a flattened sphere, a sphere, an egg, an oval, a square, or any other shape. Contemplated inserts have volumes ranging 5 to 2000 $cm^3$, more preferably 50 to 1500 $cm^3$, and most preferably 200 to 800 $cm^3$.

Regardless of overall shape, inserts can advantageously include a nib or miniature "handle" that can be pulled to facilitate removal. Additionally or alternatively, inserts could have a deformable outer shape, with sufficient rigidity to maintain a desired shape during baking, and sufficient elasticity to be pulled through an opening made by cutting of the bread following cooking. Sufficient rigidity/elasticity could be achieved using a material that is relatively hard at room temperature, but relatively elastic at an elevated temperate at which the insert might be removed from the bun. See FIG. 3, and corresponding description.

Inserts can be made with any material that is suitable for occupying a space within a portion of bread dough. In preferred embodiments, inserts are made of a food-grade material that is safe and non-toxic, even at high humidity or temperatures during cooking. In some embodiments, the insert is mostly made of a polymer material. In other embodiments, the insert is made of a hard material, such as a metal or an alloy. The inserts can be reusable or for one-time use only.

Inserts preferably have a relatively low specific heat capacity, between 0.2 and 2.0 J/g·° C., and a thermo conductivity between 0.02 and 1000 W/m·K. In preferred embodiments, inserts have a specific heat capacity between 0.2 and 1.0 J/g·° C., and a thermo conductivity between 100 and 400 W/m·K. It is contemplated specific heat capacity can be significantly reduced by using hollow inserts.

For embodiments in which the bread is cooked in a microwave environment, inserts are advantageously microwave safe. Specifically, such inserts would not damage the microwave oven, and would not absorb microwave more easily than does the surrounding dough In preferred embodiments, inserts resist sticking to both the dough before baking, and the bun after baking. In some embodiments, this can be achieved by dipping the insert into oil or flour, or by wrapping the insert with parchment paper before placing into the dough. Preferred inserts are made of or coated with a non-stick material. In especially preferred embodiments, the non-stick material is a non-stick ceramics such as those used in Calphalon® non-stick ceramic cookware. Other contemplated materials include polytetrafluoroethylene (PTFE, "Teflon™"), anodized aluminium, silicone, enameled cast iron, superhydrophobic coating (e.g., anganese oxide polystyrene ($MnO_2$/PS) nano-compositem, Zinc oxide polystyrene (ZnO/PS) nano-composite, Precipitated calcium carbonate, Carbon nano-tube structures, Silica nano-coating, Fluorinated silanes, and Fluoropolymer coatings).

In step 120, bread dough is cooked by baking, steaming, frying, or any other cooking methods to produce a roll. In preferred embodiments, cooking is performed by baking at a temperature less than 250° C. for 15-20 min. Baking can be accomplished in any suitable medium, such as an oven. Contemplated ovens include a convection oven, a non-convection oven, a microwave oven, a gas oven, an electric oven, or any combination thereof. In preferred embodiments, dough is placed on baking trays. In especially preferred embodiments, forms are used to hold individual portions and to maintain a rounded perimeter. Contemplated forms have many round-shaped wells on each form.

In step 130, the roll is cut into two pieces. Preferred embodiments include cutting around or about the insert, so that the insert is not cut through. The roll can be cut in any location that would at least partially expose the insert so that it can be removed from the bun. In preferred embodiments, the bun is cut at approximately ⅓ from one end of the bun. In other embodiments, the bun is cut significantly off center, such that the cavity in one portion of the bun has a volume at least 50% larger than the volume of the cavity in the mating portion of the bun. Preferably, the cavity in one portion of the bun has a volume at least 75% larger than the volume of the cavity in the mating portion of the bun.

The roll can be cut in any suitable manner: vertically, horizontally or somewhere in between. In preferred embodiments, the roll is cut substantially vertically (i.e., no more than 10° or off vertical). Cutting vertically is thought to be easier than cutting horizontally, since the roll has a substantially flat bottom and is stabilized by the surface on which it stands. In some embodiments, the insert is cut through, while in other embodiments, cutting is performed around the insert such that the insert is not cut through.

The cutting can be done manually or automated (i.e., by a machine or a robot). The tools used for cutting the roll can be any instrument with a sharp or serrated edge. Contemplated cutting tools include scissors, a blade, a scalpel, a kitchen knife, a rotatable knife, a circular knife, a saw, a chain saw, a circular saw, an electronic saw, and so forth. When using a traditional kitchen knife, cutting can be performed by vertically pressing the sharp or serrated edge of the knife against the bread bun, with or without sliding (i.e., moving the knife back and forth horizontally). Some embodiments use a round-shaped knife coupled to a rolling device, where the roll is cut by rolling the blade against the roll.

In step 140, the insert is removed from roll that has been cut. The removal process can be done either manually or automated (i.e., by a machine or a robot). Preferred embodiments include removing one piece of the cut bun from the other piece, thereby exposing the insert, and then pulling the insert out of the bun. In some embodiments, the insert contains a magnetic or iron core, and can be removed by applying a magnetic field to the insert, while holding the bun stationary.

Figure 2:
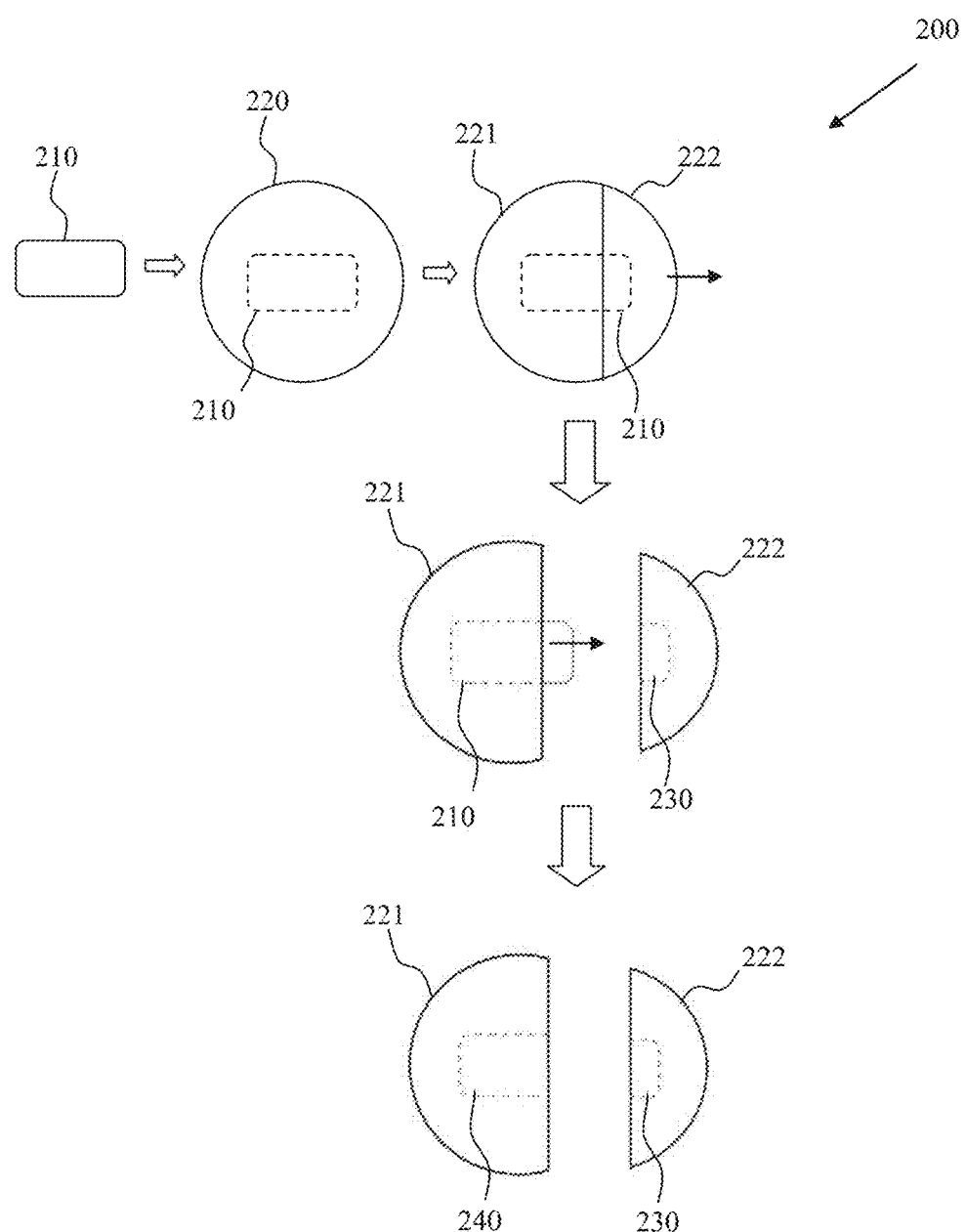
FIG. 2 illustrates steps of embedding an insert into a portion of dough, cutting a cooked bun, and removing the insert from the bun.

FIG. 2 illustrates the process in embedding an insert 210 into a portion of bread dough 220. After baking, a vertical incision is made along the insert 210, cutting the bread bun 220 into two pieces, 221 and 222. Bun 222 is pulled away from bun 221, leaving a cavity 230 in bun 222 and exposing the insert 210, while the insert 210 is still partially embedded in bun 221. Finally, insert 210 is then removed from bun 221, leaving a cavity 240 in bun 221.

Figure 3:
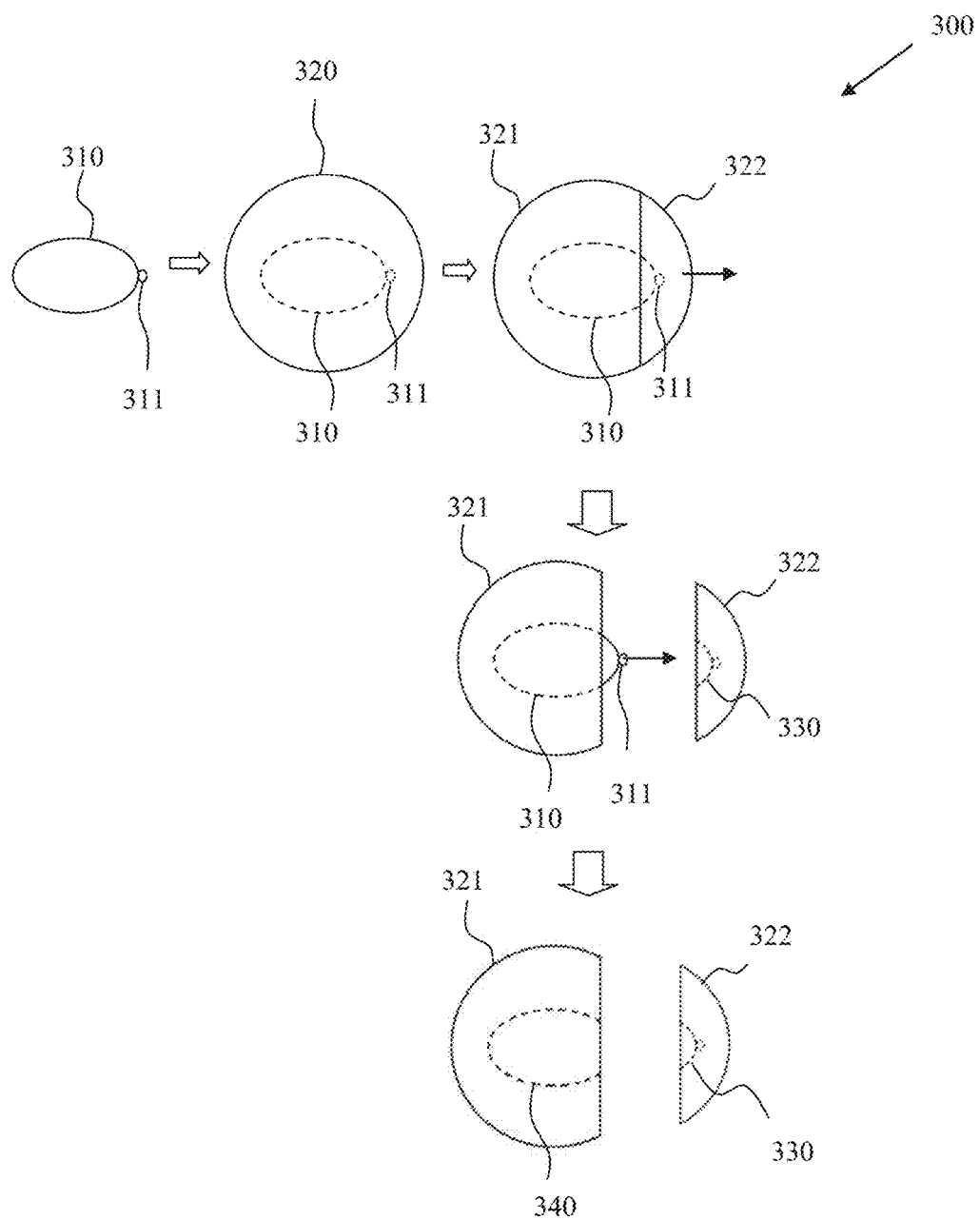
FIG. 3 illustrates steps of embedding an egg-shaped insert with a handle into a portion of dough, cutting a cooked bun, and removing an insert from the bun by pulling the handle.

FIG. 3 illustrates the process in embedding an egg-shaped insert 310 with a miniature "handle" 311 into a portion of bread dough 320. After baking, a vertical incision is made along the insert 310, cutting the bread bun 320 into two pieces, 321 and 322. Bun 322 is pulled away from bun 321, leaving a cavity 330 in bun 322 and exposing the insert 310 with the handle 311, while the insert 310 is still partially embedded in bun 321. Finally, insert 310 is then removed from bun 321 by pulling the handle 311, leaving a cavity 340 in bun 321.

In preferred embodiments, the insert 310 is made of a material is elastic when heated, such that when removed from the bun 321 while still warm, the insert 310 will be easily pulled from the bun 321 by pulling the handle 311 without damaging the bun 321.

Figure 4:
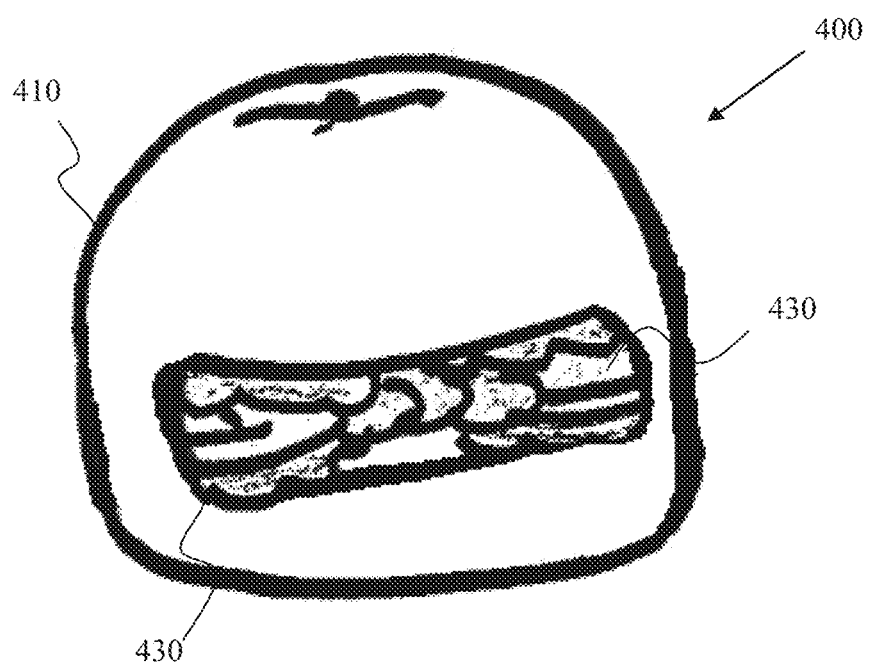
FIG. 4 is a perspective view of one piece of a two-piece pocket bun into which food is inserted.

FIG. 4 is a perspective view of a pocket bun 410 with food items 420 inserted into the cavity 430. Food items 420 should be interpreted herein to include any suitable food items, but especially flowable foods such as sloppy joe or sauces. Contemplated food items include a meat patty that is made from any one or more kinds of meat suitable for a hamburger or a sandwich, including beef, steak, lamb, pork, turkey, chicken, duck, fish, shell-fish, lobster, imitation crab, shrimp, man-made meat, meat imitations, and so forth. Other contemplated food items 420 include toppings suitable for a hamburger or a sandwich, including cheese, tomato, ketchup, onion, lettuce, cucumber, avocado, pickles, and other vegetables. Food items 420 may also be Chinese food (e.g., Kung Pao chicken), Japanese food (e.g., sushi), Mexican food, Italian food (e.g., spaghetti), Indian food (e.g., lamb curry), Korean food (e.g., barbecue), Hawaiian food, Ethiopian food, or any other food.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An ordered method of making an edible pocketed bun, comprising:
    placing an insert into a portion of bread dough;
    cooking the portion of bread dough to produce the bun; and
    cutting the bun into at least a first piece and a second piece, and removing the insert from the first and second pieces, thereby leaving a first cavity in the first piece and a second cavity in the second piece;
    wherein the bread dough completely surrounds the insert before and after cooking; and
    the insert comprises at least 10 wt % of a metal or polymer that is coated with non-edible, non-stick materials.

2. The method of claim 1, wherein at least 90 wt % of the bread dough is selected from the group consisting of flour, water and oil.

3. The method of claim 1, wherein the step of cooking comprises baking the portion of bread dough in an oven having a temperature less than 250° C.

4. The method of claim 3, wherein the portion of bread dough inserted into the oven has a height of at least 2 cm.

5. The method of claim 3, wherein the portion of bread dough inserted into the oven has a height of at least 3 cm.

6. The method of claim 1, wherein the step of cutting the bun further comprises cutting the bun at least 10% off center.

7. The method of claim 6, wherein the step of cutting the bun further comprises cutting the bun no more than 10% off vertical.

8. The method of claim 1, wherein the step of cutting the bun further comprises cutting the bun such that the first cavity has a volume at least twice times a volume of the second cavity.

9. The method of claim 1, wherein the step of cutting the bun further comprises cutting through the insert.

10. The method of claim 1, wherein the insert is not cut through during the step of cutting the insert.

11. The method of claim 1, wherein at least one step is automated.

12. The method of claim 1, wherein at least one step is achieved manually.

13. The method of claim 1, wherein the step of cutting is achieved by a round-shaped knife coupled to a rolling device.

14. The method of claim 1, wherein the step of cutting the bun into the first and second pieces produces a hole about a perimeter of a portion of the insert through which the insert is withdrawn, and the insert includes a body portion having a perimeter larger than the hole.

15. The method of claim 1, wherein the insert has a body, and a grabbing component extending from the body.

16. An ordered method of making an edible pocketed bun, comprising:
    placing an insert into a portion of bread dough;
    cooking the portion of bread dough to produce a bun;
    cutting the bun no more than 100 off vertical, at least 10% off center, into a first piece and a second piece; and
    removing the insert from the first and second pieces, thereby leaving a first cavity in the first piece and a second cavity in the second piece; wherein the second cavity is at least twice as large as the first cavity;
    wherein the bread dough completely surrounds the insert before and after cooking; and
    the insert comprises at least 10 wt % of a metal or polymer that is coated with non-edible, non-stick materials.

17. The method of claim 16, wherein the insert has a body, and a grabbing component extending from the body.

18. An ordered method of making an edible pocketed bun, comprising:
    placing an insert into a portion of bread dough, wherein the insert has a body, and a grabbing component extending from the body;
    cooking the portion of bread dough to produce a bun;
    cutting the bun into a first piece and a second piece; and
    removing the insert from the first and second pieces by engaging the grabbing component, thereby leaving a first cavity in the first piece and a second cavity in the second piece, wherein the second cavity is at least twice as large as the first cavity;
    wherein the bread dough completely surrounds the insert before and after cooking; and
    the insert comprises at least 10 wt % of a metal or polymer that is coated with non-edible, non-stick materials.

* * * * *